United States Patent
Navé

(10) Patent No.: US 8,818,156 B2
(45) Date of Patent: Aug. 26, 2014

(54) MULTIPLE CHANNEL OPTICAL FIBER FURCATION TUBE AND CABLE ASSEMBLY USING SAME

(75) Inventor: Samuel D. Navé, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 337 days.

(21) Appl. No.: 13/070,923

(22) Filed: Mar. 24, 2011

(65) Prior Publication Data

US 2011/0243514 A1 Oct. 6, 2011

Related U.S. Application Data

(60) Provisional application No. 61/318,966, filed on Mar. 30, 2010.

(51) Int. Cl.
*G02B 6/00* (2006.01)

(52) U.S. Cl.
USPC .............................. 385/134; 385/136; 385/137

(58) Field of Classification Search
USPC .................................. 385/134, 135, 136, 137
See application file for complete search history.

(56) References Cited

U.S. PATENT DOCUMENTS

| | | | |
|---|---|---|---|
| 4,038,489 A | 7/1977 | Stenson et al. | 174/70 R |
| 4,626,067 A | 12/1986 | Watson | 350/96.2 |
| 4,804,245 A | 2/1989 | Katayose et al. | 350/96.23 |
| 4,983,013 A | 1/1991 | Dotzer et al. | 350/96.23 |
| 5,087,110 A | 2/1992 | Inagaki et al. | 385/110 |
| 5,231,688 A | 7/1993 | Zimmer | 385/139 |
| 5,289,556 A | 2/1994 | Rawlyk et al. | 385/112 |
| 5,473,718 A | 12/1995 | Sommer | 385/87 |
| 5,649,042 A | 7/1997 | Saito | 385/109 |
| 5,838,861 A | 11/1998 | Bunde | 385/100 |
| 5,903,693 A | 5/1999 | Brown | 385/100 |
| 5,952,615 A | 9/1999 | Prudhon | 174/113 |
| 5,966,489 A | 10/1999 | Harwell et al. | 385/114 |
| 5,967,315 A | 10/1999 | Langtry, II | 206/315.11 |
| 5,970,195 A | 10/1999 | Brown | 385/100 |
| 6,072,932 A | 6/2000 | Bennett et al. | 385/139 |
| 6,104,855 A | 8/2000 | Jeon | 385/139 |
| 6,122,427 A | 9/2000 | Yokokawa et al. | 385/110 |
| 6,248,954 B1 | 6/2001 | Clark et al. | 174/113 R |

(Continued)

FOREIGN PATENT DOCUMENTS

| | | | | |
|---|---|---|---|---|
| EP | 763831 A | 3/1997 | | H01B 11/06 |
| EP | 0996016 A2 | 4/2000 | | |

(Continued)

OTHER PUBLICATIONS

European Patent Search Report, Application No. 11160221.5, Jul. 2, 2013, 8 pages.

*Primary Examiner* — Jennifer Doan
(74) *Attorney, Agent, or Firm* — Russell S. Magaziner (57) ABSTRACT

A furcation tube for an optical fiber cable comprising a plurality of channels for receiving a plurality of optical fiber strands that allows for the breakout of multiple fiber groups without the need for marking individual fibers. For example, a 24 fiber cable can be broken out into two, 12-fiber groups within the same furcation tube for connectorization. This improves the sortabililiy of the optical fiber strands and eliminates the extra bulk of using multiple furcation tubes. The furcation tube includes strength members disposed therein for strain relief.

20 Claims, 5 Drawing Sheets

(56) References Cited

U.S. PATENT DOCUMENTS

| | | | |
|---|---|---|---|
| 6,278,831 B1 | 8/2001 | Henderson et al. | 385/139 |
| 6,297,454 B1 | 10/2001 | Gareis | 174/113 |
| 6,356,836 B1 | 3/2002 | Adolph | 701/208 |
| 6,389,214 B1 | 5/2002 | Smith et al. | 385/136 |
| 6,438,299 B1 | 8/2002 | Brown et al. | 385/100 |
| 6,477,304 B2 | 11/2002 | Dallas et al. | 385/110 |
| 6,566,605 B1 | 5/2003 | Prudhon | 174/113 |
| 6,596,944 B1 | 7/2003 | Clark et al. | 174/113 C |
| 6,639,152 B2 | 10/2003 | Glew et al. | 174/113 |
| 6,687,437 B1 | 2/2004 | Starnes et al. | 385/101 |
| 6,738,555 B1 | 5/2004 | Cooke et al. | 385/136 |
| 6,764,221 B1 | 7/2004 | De Jong et al. | 385/55 |
| 6,771,861 B2 | 8/2004 | Wagner et al. | 385/100 |
| 6,787,697 B2 | 9/2004 | Stipes et al. | 174/36 |
| 6,826,338 B2 * | 11/2004 | Matsuyama | 385/110 |
| 6,855,889 B2 | 2/2005 | Gareis | 174/113 |
| 6,885,798 B2 | 4/2005 | Zimmel | 385/100 |
| 6,888,070 B1 | 5/2005 | Prescott | 174/113 |
| 6,909,828 B2 | 6/2005 | Zimmel et al. | 385/100 |
| 7,035,510 B2 | 4/2006 | Zimmel et al. | 385/100 |
| 7,035,511 B1 | 4/2006 | Rhoney et al. | 385/100 |
| 7,098,405 B2 | 8/2006 | Glew | 174/113 |
| 7,145,080 B1 | 12/2006 | Boisvert et al. | 174/110 |
| 7,173,191 B2 | 2/2007 | Prescott | 174/113 |
| 7,196,272 B2 | 3/2007 | Glew | 174/113 |
| 7,202,418 B2 | 4/2007 | Glew | 174/113 |
| 7,203,404 B2 | 4/2007 | Greenwood et al. | 385/112 |
| 7,238,885 B2 | 7/2007 | Lique et al. | 174/113 |
| 7,241,953 B2 | 7/2007 | Glew | 174/113 |
| 7,242,841 B2 | 7/2007 | Greenwood et al. | 385/137 |
| 7,270,485 B1 | 9/2007 | Robinson et al. | 385/55 |
| 7,277,614 B2 | 10/2007 | Cody et al. | 385/100 |
| 7,280,725 B2 | 10/2007 | Brown et al. | 385/100 |
| 7,330,629 B2 | 2/2008 | Cooke et al. | 385/136 |
| 7,375,284 B2 | 5/2008 | Stutzman et al. | 174/110 |
| 7,399,926 B2 | 7/2008 | Park et al. | 174/113 |
| 7,405,360 B2 | 7/2008 | Clark et al. | 174/113 |
| 7,415,181 B2 | 8/2008 | Greenwood et al. | 385/100 |
| 7,432,447 B2 | 10/2008 | Glew | 174/113 |
| 7,461,981 B2 | 12/2008 | Yow, Jr. et al. | 385/76 |
| 7,463,803 B2 | 12/2008 | Cody et al. | 385/100 |
| 7,471,862 B2 | 12/2008 | Bringuier et al. | 385/113 |
| 7,473,849 B2 | 1/2009 | Glew | 174/113 |
| 7,473,850 B2 | 1/2009 | Glew | 174/113 |
| 7,491,888 B2 | 2/2009 | Clark et al. | 174/113 |
| 7,505,663 B2 | 3/2009 | Zimmel | 385/135 |
| 7,507,910 B2 | 3/2009 | Park et al. | 174/113 |
| 7,512,308 B2 | 3/2009 | Barnes et al. | 385/139 |
| 7,534,964 B2 | 5/2009 | Clark et al. | 174/110 |
| 7,550,676 B2 | 6/2009 | Stutzman et al. | 174/110 |
| 7,612,289 B2 | 11/2009 | Lique et al. | 174/113 |
| 7,637,776 B2 | 12/2009 | McNutt | 439/607.05 |
| 7,903,925 B2 * | 3/2011 | Cooke et al. | 385/136 |
| 8,155,490 B2 * | 4/2012 | de Jong et al. | 385/100 |
| 2002/0136512 A1 | 9/2002 | Dallas et al. | 385/110 |
| 2003/0037955 A1 | 2/2003 | Glew et al. | 174/99 |
| 2003/0103743 A1 | 6/2003 | Sun et al. | 385/114 |
| 2003/0132021 A1 | 7/2003 | Gareis | 174/113 |
| 2004/0124000 A1 | 7/2004 | Stipes et al. | 174/113 |
| 2004/0149483 A1 | 8/2004 | Glew | 174/113 |
| 2005/0002621 A1 | 1/2005 | Zimmel et al. | 385/100 |
| 2005/0031276 A1 | 2/2005 | Zimmel et al. | 385/100 |
| 2005/0103518 A1 | 5/2005 | Glew | 174/113 |
| 2005/0167149 A1 | 8/2005 | Prescott | 174/113 |
| 2005/0167151 A1 | 8/2005 | Kenny et al. | 174/113 |
| 2005/0184411 A1 | 8/2005 | Konstadinidis et al. | 264/1.27 |
| 2005/0199415 A1 | 9/2005 | Glew | 174/113 |
| 2005/0244115 A1 | 11/2005 | Bocanegra et al. | 385/110 |
| 2005/0276551 A1 | 12/2005 | Brown et al. | 385/100 |
| 2006/0096777 A1 | 5/2006 | Glew | 174/113 |
| 2006/0237217 A1 | 10/2006 | Glew | 174/113 |
| 2006/0237218 A1 | 10/2006 | Glew | 174/113 |
| 2006/0237221 A1 | 10/2006 | Glew | 174/146 |
| 2007/0025668 A1 | 2/2007 | Greenwood et al. | 385/103 |
| 2007/0044994 A1 | 3/2007 | Park et al. | 174/113 |
| 2007/0044995 A1 | 3/2007 | Park et al. | 174/113 |
| 2007/0044996 A1 | 3/2007 | Clark | 174/113 |
| 2007/0066124 A1 | 3/2007 | Park et al. | 439/418 |
| 2007/0098339 A1 | 5/2007 | Bringuier et al. | 385/106 |
| 2007/0102188 A1 | 5/2007 | Glew | 174/113 |
| 2007/0144763 A1 | 6/2007 | Park et al. | 174/113 |
| 2007/0151745 A1 | 7/2007 | Glew | 174/113 |
| 2007/0151746 A1 | 7/2007 | Glew | 174/113 |
| 2007/0187132 A1 | 8/2007 | Watt | 174/113 |
| 2007/0193769 A1 | 8/2007 | Clark et al. | 174/113 |
| 2007/0209823 A1 | 9/2007 | Vexler et al. | 174/113 |
| 2007/0209825 A1 | 9/2007 | Glew | 174/113 |
| 2007/0275583 A1 | 11/2007 | McNutt et al. | 439/225 |
| 2008/0041609 A1 | 2/2008 | Gareis et al. | 174/113 |
| 2008/0066947 A1 | 3/2008 | Glew | 174/131 |
| 2008/0251276 A1 | 10/2008 | Clark et al. | 174/113 |
| 2008/0264670 A1 | 10/2008 | Glew | 174/113 |
| 2008/0283274 A1 | 11/2008 | Stutzman et al. | 174/113 |
| 2009/0014202 A1 | 1/2009 | Clark et al. | 174/113 |
| 2009/0074364 A1 | 3/2009 | Bringuier et al. | 385/103 |
| 2009/0120664 A1 | 5/2009 | Clark et al. | 174/113 |
| 2009/0126971 A1 | 5/2009 | Fok | 174/113 |
| 2009/0196553 A1 | 8/2009 | Anderson et al. | 385/54 |
| 2009/0308634 A1 | 12/2009 | Baeck et al. | 174/120 |
| 2009/0324183 A1 | 12/2009 | Bringuier et al. | 385/113 |
| 2011/0262088 A1 | 10/2011 | Hurley et al. | 385/110 |

FOREIGN PATENT DOCUMENTS

| | | | | |
|---|---|---|---|---|
| EP | 1388020 | B1 | 9/2004 | G02B 6/44 |
| EP | 1619695 | A2 | 1/2006 | H01B 11/06 |
| EP | 1638112 | A2 | 3/2006 | H01B 11/08 |
| EP | 2061042 | A2 | 5/2009 | H01B 11/06 |
| EP | 2163928 | A2 | 3/2010 | G02B 6/44 |
| FR | 2662270 | | 11/1991 | |
| WO | 00/72072 | A1 | 11/2000 | |
| WO | WO01/29848 | A1 | 4/2001 | H01B 7/18 |
| WO | WO01/41158 | A1 | 6/2001 | H01B 7/00 |
| WO | WO2013/087445 | A1 | 6/2013 | G02B 6/44 |

* cited by examiner

MULTIPLE CHANNEL OPTICAL FIBER FURCATION TUBE AND CABLE ASSEMBLY USING SAME

RELATED APPLICATIONS

This application is related to U.S. Provisional App. No. 61/318,966, filed Mar. 30, 2010, and entitled "Multiple Channel Optical Fiber Furcation Tube and Cable Assembly Using Same."

FIELD

The present invention relates to a protective casing for containing optical fiber strands, and more particularly, a furcation tube comprising multiple cavities that allow optical fiber strands to be routed into, through, and stored in smaller spaces. The protective casing allows optical fiber strands to fit therein while maintaining a relatively small footprint that can readily fit to select optical fiber connectors, providing the strength needed to protect the optical fiber strands, and allows forming of relatively small bend radii and winding on a reel without kinking and damaging the optical fibers.

BACKGROUND

Optical fibers are widely used in a variety of applications, most notably in telecommunications, where optical fibers revolutionized the industry. Optical fibers are typically carried in fiber optic cables which range from one to as many as hundreds of optical fibers per cable. Normally, the fiber optic cable contains optical fiber strands in buffer tubes, either loose or in ribbon form. If a cable is to be joined to another cable or hardware in the field by connectors, it is common to attach the connectors to the cable at the factory before the cable is shipped to the installation site. This process is called "connectorization."

Fiber optic cable connectorization can be a very labor intensive process because the fiber optic connector is usually attached to each optical fiber in the fiber optic cable manually, one at a time. The manual process involves breaking out or "furcating" the optical fiber strands housed in the buffer tube or tubes inside the fiber optic cable using a buffer tube fanout insert assembly. For example, U.S. Pat. No. 5,231,688 discloses a furcation kit used to furcate the individual fibers from a cable for connectorization. After furcation, a connector is installed that requires precise techniques to insure quality.

Optical cables comprising 12-strand groups have typically been used for connectivity in data centers. The optical fiber strands of a particular 12-strand group can be furcated using a single-channel furcation tube and thereby routed to a 12 fiber connector where the individual optical fibers are terminated in the connector. Typically, the connector is configured to receive the furcation tube and is coupled thereto. With the migration from 10 GbE systems to 40 GbE and 100 GbE systems there will be a need to transition to 24 fiber connectors for data transmission over parallel optics. Since standardized color coding provides for only 12 colors (without resorting to stripes, bands or additional indicia), using a conventional single-cavity furcation tube to accommodate 24 optical fiber strands will require 12 of the 24 strands to be separately marked so they can be sorted at the connector end. Moreover, using two single-cavity furcation tubes and feeding them into the back of the 24 fiber connector would be bulky and cumbersome, and is not a commercially attractive option. Thus, there is a need for a furcation tube sized to fit properly into the back of a conventional 24-strand connector that avoids the disadvantages of one or two single-cavity furcation tubes.

SUMMARY

Furcation tubes are useful for the fanout of optical fiber strands from an optical fiber cable, allowing, among other things, for the connectorization of a cable length prior to shipping from the factory or warehouse to an end user. Prior art furcation tubes have been single channel tubes. Where an optical fiber cable contains optical fiber strands utilizing only 12 standard colors for coding, difficulties can arise when attempting to connectorize the cable with an optical fiber connector that accepts more than 12 colors. Whereas individual 12-strand color groups can be segregated within the cable via individual buffer tubes (e.g. one buffer tube for each group of twelve strands), if, for example, 24 optical fiber strands must be used with a single connector, the 24 strands utilizing 12 colors must be co-mingled within the same conventional single channel furcation tube to transition to the connector. This requires additional demarcation of the optical fiber strands to prevent confusion, or the use of several furcation tubes, one tube for each 12-strand group. Both approaches can be awkward. For example, the several single channel furcation tubes may not fit within the back side of the optical fiber connector.

To overcome these difficulties, a furcation tube comprising multiple channels for loosely receiving a plurality of optical fiber strands is disclosed. By loosely receive what is meant is that the optical fiber strands contained within each channel of the furcation tube are free to move within that channel. Additionally, the furcation tube includes one or more additional channels that hold strength members for relieving strain on the optical fiber strands when the strands are connectorized. The strength members may comprise, for example, a polymeric yarn like aramid.

In accordance with one embodiment, a furcation tube for connectorizing an optical fiber cable is described, the furcation tube comprising a first end and a second end, and further comprising a partition member, a protective jacket disposed about the partition member, and wherein the partition member defines a plurality of longitudinal fiber channels extending from the first end to the second end of the furcation tube, each of the fiber channels sized to loosely receive at least twelve optical fiber strands having an individual outside diameter of at least about 235 μm each, and wherein the partition member further defines a plurality of longitudinal strength member channels extending from the first end to the second end, each strength member channel including one or more strength members disposed loosely therein. The furcation tube is sized to accommodate at least two optical fiber channels having a cross sectional area that is at least 1 mm$^2$ each. For example, the furcation tube may have an outside diameter in the range between about 2.8 mm and 5.6 mm, preferably in the range between about 2.8 mm and 3.3 mm.

The strength members preferably comprise a polymeric yarn. In some embodiments the partition member comprises web portions, wherein an intersection between adjacent web portions forms a radius. The web portions may be, for example, substantially planar walls or fins. The partition member may comprise two V-shaped web portions connected to and separated by a central web portion. In some embodiments an angle between substantially planar web portions bounding a strength member channel is in a range between about 60 degrees and about 90 degrees. Preferably a cross sectional shape of the furcation tube is substantially circular.

In another embodiment a connectorized optical fiber cable assembly is disclosed comprising an optical fiber cable comprising a plurality of optical fiber strands, a furcation tube having a first end and a second end, the furcation tube comprising a partition member and the first end being coupled to a free end of the optical fiber cable and. The partition member forms a plurality of longitudinal fiber channels extending from the first end of the furcation tube to the second end of the furcation tube, each of the fiber channels loosely containing at least twelve optical fiber strands from the optical fiber cable, the optical fiber strands having an individual outside diameter of at least 235 μm each, and wherein the partition member further forms at least one longitudinal strength member channel extending from the first end of the furcation tube to the second end of the furcation tube. The at least one strength member channel includes one or more strength members disposed loosely therein. The one or more strength members may comprise, for example, a polymeric yarn. The partition member can include substantially planar web portions. An intersection between adjacent web portions can be manufactured to form a radius. The partition member may comprise two V-shaped web portions connected to and separated by a central web portion. An angle between substantially planar web portions bounding a strength member channel is preferably in a range between about 60 degrees and about 90 degrees.

A cross sectional area of each fiber channel is at least 1 mm$^2$.

An optical fiber connector is coupled to the second end of the furcation tube. In some embodiments a protective jacket is disposed about the partition member. Preferably, a cross sectional shape of the furcation tube is substantially circular. An outside diameter of the furcation tube can be in the range between about 2.8 mm and 5.6 mm, preferably between about 2.8 and 3.3 mm.

In certain embodiments the furcation tube is un-jacketed, and the plurality of fiber channels are enclosed within the partition member along a length of the partition member. That is, each fiber channel is embedded within the partition member and is open only at the furcation tube ends. The partition member may further include a plurality of strength member channels, each strength member channel being enclosed within the partition member along a length of the partition member.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Figure 1:
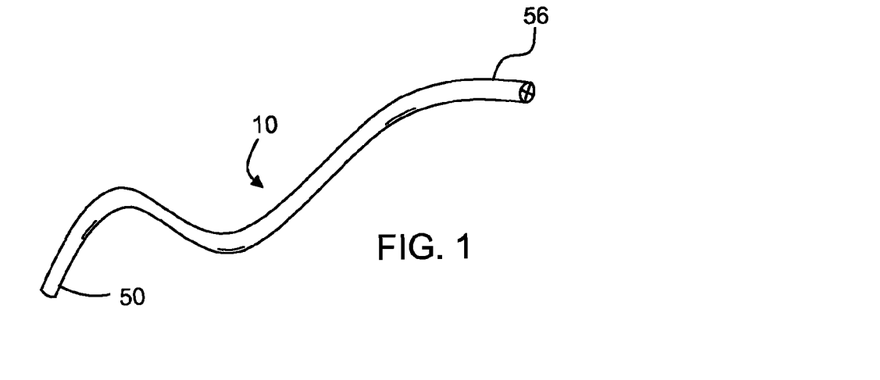
FIG. 1 is a perspective view of a furcation tube according to an embodiment of the present invention.
Figure 2:
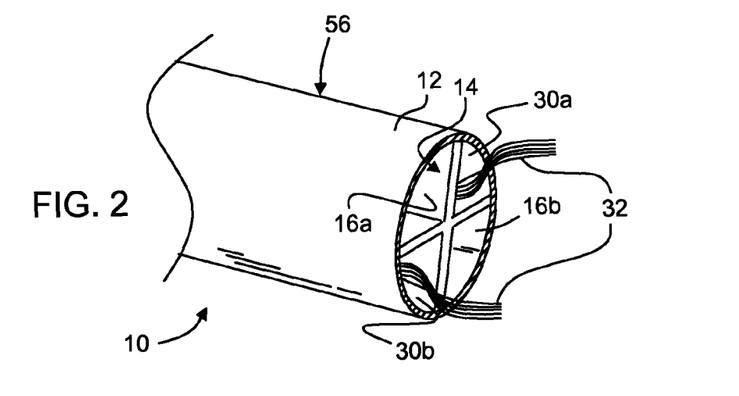
FIG. 2 is a cross sectional view of an exemplary optical fiber strand.

FIGS. 1 and 2 depict an embodiment of furcation tube 10 comprising protective jacket 12 and a plurality of cavities or channels formed by partition member 14. For example, furcation tube 10 may comprise at least two channels 16a and 16b that extend along the length of the furcation tube, the channels being sized to loosely receive multiple optical fiber strands. That is, channels 16a and 16b are sized so the optical fiber strands can move freely with respect to protective jacket 12 and partition member 14. For example, each channel 16a and 16b can be sized to loosely contain at least twelve optical fiber strands having an outside diameter of between 235 and 265 μm, nominally between about 245 μm to about 255 μm. Thus, the cross sectional area of each channel 16a and 16b in a plane perpendicular to the longitudinal axis of furcation tube 10 should be at least about 1 mm$^2$, but in any case should provide for a packing density in a single channel (i.e. channel 16a or channel 16b) of approximately 60% when the channel contains twelve optical fiber strands having a nominal outside diameter of up to 265 μm. Consequently, at least a portion of the volume of each channel 16a, 16b is not filled by the optical fiber strands.

An outside diameter OD of the furcation tube (see FIG. 4) is preferably in the range between about 2.8 mm and 5.6 mm, more preferably between about 2.8 mm and about 3.3 mm. A nominal protective jacket thickness t is preferably between about 0.25 mm and about 0.35 mm, with a typical protective jacket thickness of about 0.3 mm. To aid in maintaining a small outside diameter of furcation tube 10, the protective jacket preferably consists of only a single jacket layer, however additional layers can be used if desired. The small outside diameter of the furcation tube helps alleviate congestion within an equipment rack. Additionally, furcation tube 10 is preferably substantially circular to more easily facilitate coupling of the furcation tube to a connector, but can be formed to have other shapes if desired.

Figure 3:
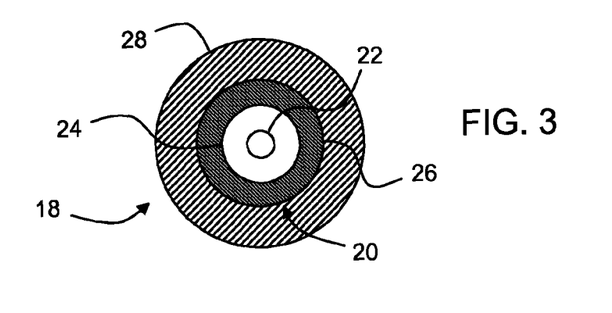
FIG. 3 is a cross sectional view of a furcation tube according to an embodiment of the present invention.

An exemplary cross sectional illustration of an optical fiber strand 18 that can be used with the present furcation tube is shown in FIG. 3. Optical fiber strand 18 comprises an optical fiber 20 including core portion 22 and cladding portion 24. Optical fiber 20 is preferably coated with one or more layers of a polymeric protective coating material such as an acrylate. As shown in FIG. 3, optical fiber 20 is coated with a soft polymeric inner primary coating 26 and a harder polymeric outer secondary coating 28. Optical fiber 20 may be plastic or glass but is more commonly glass. Thus, core portion 22 and cladding portion 24 are preferably glass. However, in some embodiments core portion 22 and cladding portion 24 may be formed from plastic, and in certain other embodiments, core portion 22 may be glass and cladding portion 24 may be formed from plastic. As described, the outside diameter of optical fiber strand 18 is typically at least about 235 µm, and preferably in the range from about 235 µm to about 265 µm. A typical outside diameter can be, for example, about 250 µm.

Figure 4:
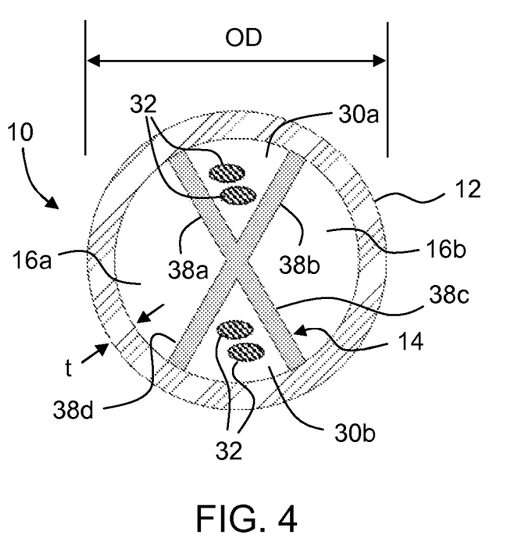
FIG. 4 is a cross sectional view of a furcation tube according to another embodiment of the present invention.

Furcation tube 10 may further comprise one or more additional channels that extend along the length of the furcation tube, the additional channels being sized to receive strength members. For example, according to the embodiment of FIG. 4 depicting a cross sectional view of a furcation tube 10, the furcation tube comprises two channels 16a and 16b sized to loosely receive a plurality of optical fiber strands, and two additional channels 30a and 30b sized to receive one or more strength members 32, such as polymeric yarns. The yarns may, for instance, be aramid yarns, but may also be formed from any other suitable material such as fiberglass or polyester. The yarns may have a denier in the range from about 250 to about 3000. A typical denier is about 1420. According to the present embodiment and as shown in FIG. 4, two strength member, e.g. yarns, are included in each of channels 30a and 30b. Each yarn may comprise hundreds of individual filaments. Strength members 32 provide longitudinal strength to the furcation tube, and may also serve as anchoring points to relieve strain on the jacket and/or partition member, and in particular the optical fiber strands. Since threading strength yarns from the cable to be connectorized through the furcation tube can be difficult, the yarns are preferably deposited in additional channels 30a and 30b when the furcation tube is formed, e.g. during an extrusion process.

As also indicated in FIG. 4, channels 16a, 16b and 30a, 30b are defined by partition member 14 within the interior space of defined by jacket 12. Partition member 14 is an extruded member formed from a suitable thermoplastic. Suitable materials include, but are not limited to PVC, PE, PP, PBT, FRPE, FEP, ETFE and PTFE. Preferably the material from which the partition member is formed has a low surface friction to allow the optical fibers to slide easily through the channels. Method of extruding complex polymeric shapes are well known and will not be covered here.

Figure 5:
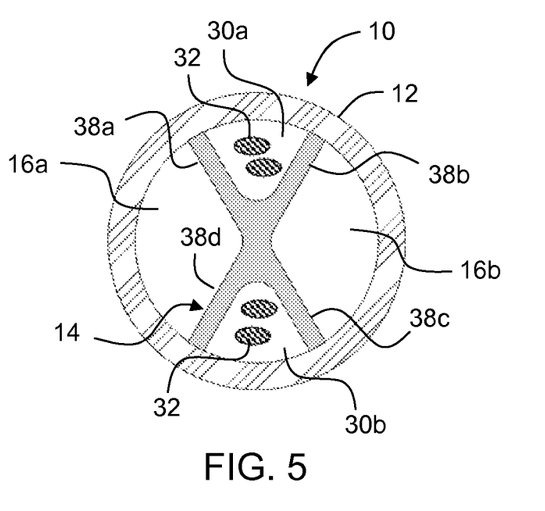
FIG. 5 is a cross sectional view of a furcation tube according to another embodiment of the present invention.
Figure 6:
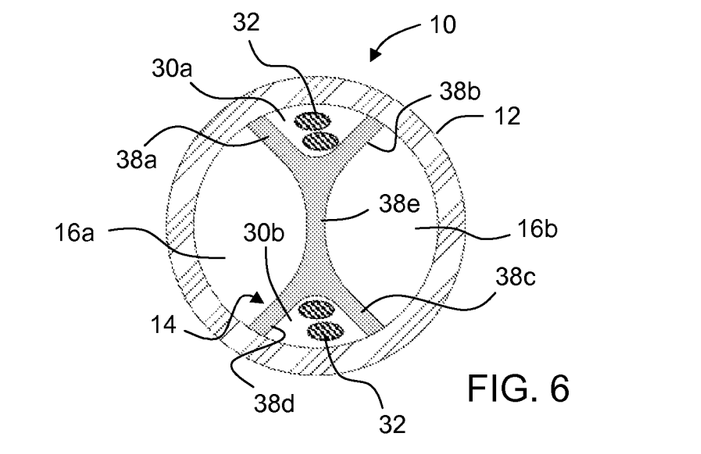
FIG. 6 is a cross sectional view of a furcation tube according to another embodiment of the present invention.

As shown in FIG. 4, partition member 14 may, in some embodiments, be generally in the shape of an "X" (cruciform). For example, the partition member of FIG. 4 has an "X" shape formed by intersecting web portions 38a-38d. As shown, web portions 38a-38d intersect each other at sharp angles. The web portions have a nominal thickness of about 0.2 mm. In some embodiments, the web portions are substantially planar. However, it should be recognized that the web portions can be formed into different shapes, such as curved, or having multiple segments. In other embodiments, such as the embodiment shown in FIG. 5, the web portions may have a radius formed at their intersection points. A radius of between about 0.2 and 0.3 mm has been found to be adequate. For example, a nominal radius of 0.25 can be used. In still other embodiments, such as the embodiment of FIG. 6, the partition member includes central web portion 38e separating fiber channels 16a and 16b. In this instance, web portions 38a-38d extend outward from ends of the central web 38e to the inside surface of the furcation tube jacket.

Figure 7:
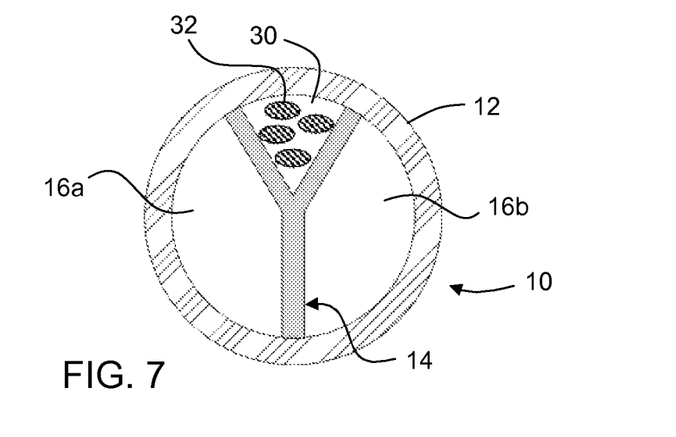
FIG. 7 is a cross sectional view of a furcation tube according to another embodiment of the present invention.

In still another embodiment illustrated in FIG. 7, furcation tube 10 comprises channels 16a and 16b for loosely receiving a plurality of optical fiber strands 18, and a single channel 30 containing one or more strength members 32 formed by a "Y" shaped partition member 14. In the orientation depicted, the "Y" is formed by one web portion forming the downward leg of the "Y", and two additional web portions in the form of a "V" that intersect with the downward leg. As in the previous embodiments, partition member 14 and strength members 32 are surrounded by jacket 12.

Figure 8:
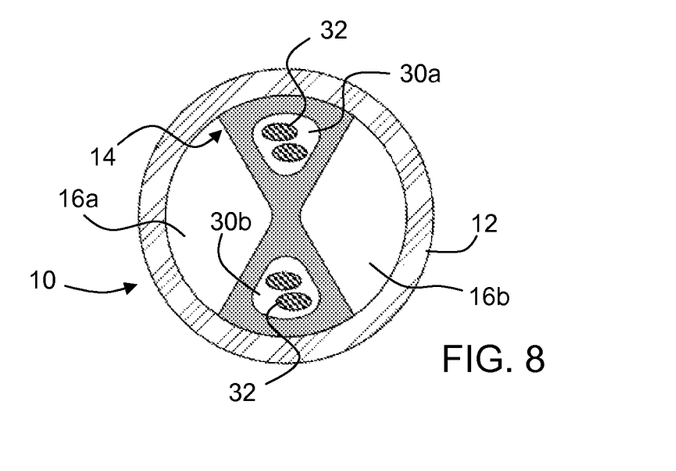
FIG. 8 is a cross sectional view of a furcation tube according to another embodiment of the present invention.

In accordance with the embodiment shown in FIG. 8, partition member 14 is formed without web portions, and is instead a generally solid body with the exception that the one or more channels containing strength members 32 extend longitudinally through the partition member. In cross sectional aspect, the partition member according to the present embodiment appears as a filled in or solid "X" shape (with the exception of the strength member channels). In contrast to the previous embodiments, strength member channels 30a and 30b according to the embodiment of FIG. 8 are not open along their longitudinal extent, but instead are contained entirely within the partition member, having openings only at the ends of the furcation tube. However, similar to the previous embodiments, channels 16a and 16b for loosely receiving a plurality of optical fiber strands are formed between the partition body and jacket 12.

Figure 9:
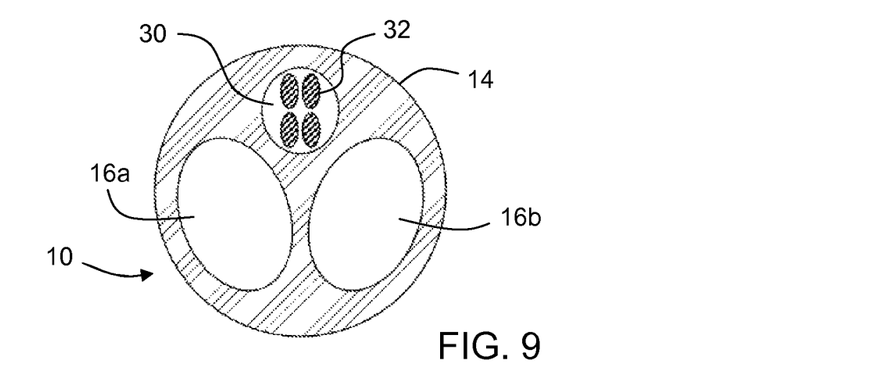
FIG. 9 is a cross sectional view of a furcation tube according to another embodiment of the present invention.
Figure 10:
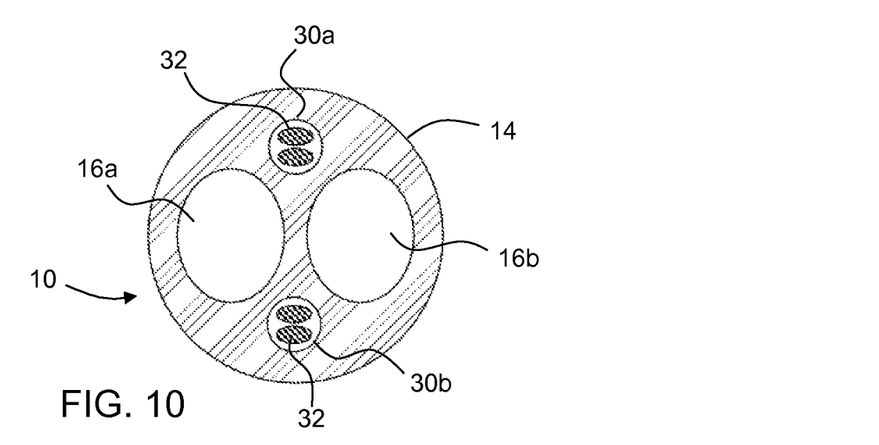
FIG. 10 is a cross sectional view of a furcation tube according to another embodiment of the present invention.
Figure 11:
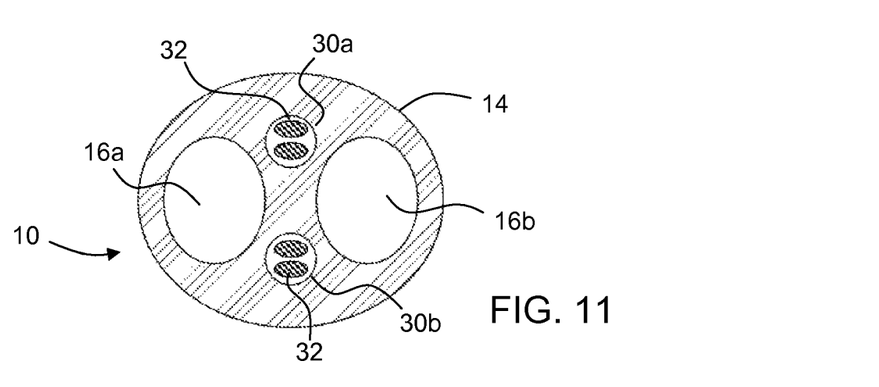
FIG. 11 is a cross sectional view of a furcation tube according to another embodiment of the present invention.

In still other embodiments, furcation tube 10 may be formed without jacket 12, and include only partition member 14. In the embodiments of FIGS. 9-11, partition member 14 defines a pair of channels or cavities 16a, 16b for loosely receiving a plurality of optical fiber strands, and at least one channel containing one or more strength members. FIG. 9, for example, depicts furcation tube 10 comprising channels 16a and 16b for loosely receiving a plurality of optical fiber strands, for example at least 12 optical fiber strands per channel, and a single channel 30 containing at least one strength member 32, and in this instance a plurality of strength members (e.g. four). Partition member 14 includes a substantially circular cross section in a plane perpendicular to the longitudinal dimension of the partition member. In the embodiment of FIG. 10, partition member 14 includes two channels 30a and 30b containing at least one strength member 32 each, and in this instance, two strength members 32 each. The embodiment according to FIG. 11 is identical to the embodiment of FIG. 10 except that a cross sectional shape of the partition member is non-circular (e.g. oval) rather than substantially circular.

Figure 12:
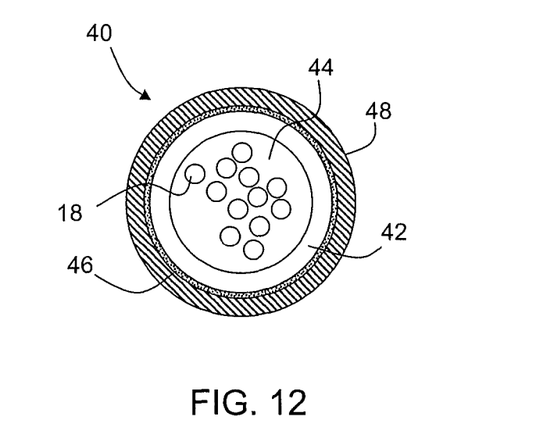
FIG. 12 is a cross sectional view of an exemplary optical fiber cable.

Furcation tube 10 may be used by itself or as a part of a cable 40 or other assembly. A cross sectional view of an exemplary optical fiber cable is shown in FIG. 12, the optical fiber cable comprising an inner buffer tube 42 forming interior cavity 44 and containing a plurality of optical fiber strands 18, one or more cable strength members 46, and a cable sheath 48 that provides mechanical protection to buffer tube 42 and the optical fiber strands within. In the exemplary optical fiber cable of FIG. 12, optical fiber cable strength member 46 is shown as polymer yarns or filaments disposed between buffer tube 42 and cable sheath 48. It should be understood however that the furcation tubes disclosed herein may be used with a myriad of different cable designs, and the exemplary optical fiber cable of FIG. 12 should not be viewed is limiting in this respect.

Figure 13:
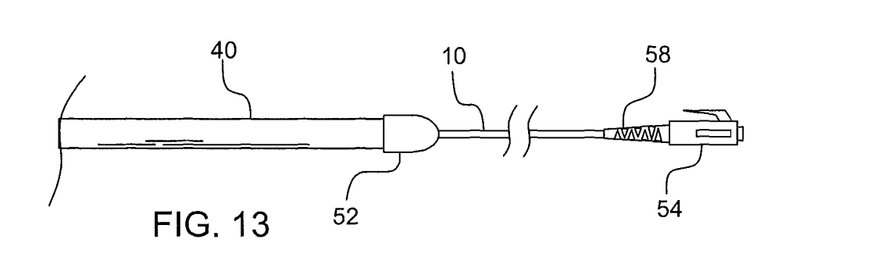
FIG. 13 is a side view of a connectorized optical fiber cable assembly according to an embodiment of the present invention.

Typically, furcation tubes 10 are attached to an optical fiber cable, such as the cable of FIG. 12, to break out and transition the optical fiber strands therein to a connector. That is, the furcation tube is used to connectorize the cable. FIG. 13 depicts furcation tube 10 used for such a purpose, wherein a first end 50 (see FIG. 1) of furcation tube 10 is affixed to optical cable 40 via plug 52. To appropriately route the optical fibers from the fiber optic cable to the connectors, plug 52 may be used to control and manage the one or more furcation tube containing the optical fiber strands. The plug may be a pre-molded article having specific holes for inserting one or more furcation tubes, such as an injection molded article formed from a thermoplastic, or the plug may be a customized article formed at the time the optical fiber cable is connectorized with one or more connectors by filling a disposable mold with an epoxy adhesive. Plug 52 affixes the one or more furcation tubes to the cable, anchors the furcation tube strength members 32 at the cable end, and protects the optical fiber strands at the transition from cable buffer tube 42 to furcation tube 10.

FIG. 13 illustrates one embodiment of plug 52 formed using an epoxy adhesive. While FIG. 13 shows only a single furcation tube, it should be understood that multiple furcation tubes may be embedded within the plug. To form the assembly shown in FIG. 13, a length of cable sheath 48 is removed from cable 40, exposing any buffer tubes (e.g. buffer tube 42) that contain optical fiber strands and cable strength members 46 contained within the cable. Lengths of the cable buffer tubes are also removed, leaving the optical fiber strands exposed at the end of the cable. The cable sheath removal length and cable buffer tube lengths required at the end of the cable are based on the specific installation requirements. The cable strength members are removed as close as necessary to the cable sheath end. To ensure adequate stress relief of the cable at the epoxy, the strength members 46 of the cable may be exposed, and fanned out and back around the cable jacket so the ends of strength members 46 are embedded within the epoxy plug when it cures.

A length of flexible tubing (not shown) that serves as a mold, such as vinyl heat shrink tube, is slid over the end of the cable from which the sheath was removed, and the optical fiber strands are threaded through the appropriate channels or cavities 16a, 16b of furcation tube 10 with the first end of the furcation tube within the vinyl molding tube. The vinyl molding tube is clamped to the cable sheath at the far end of the vinyl molding tube (farthest from the cable end to be connectorized), such as by a hose clamp, and the cavity formed by the vinyl tube filled with an epoxy adhesive. When the epoxy is cured, the vinyl molding tube is sliced open and removed, leaving furcation tube 10 anchored within the thus formed epoxy plug 52. To ensure adequate stress relief of the optical fiber connector attached to the second end of the furcation tube, the strength members 32 of the furcation tube may be exposed at the first end 50 of furcation tube 10, and fanned out and back around furcation tube end so the ends of strength members 32 are embedded within the epoxy plug when it cures. Following attachment of furcation tube 10 to cable 40 via plug 52, optical fiber connector 54 (e.g. a multi-fiber optical connector) is attached to second end 56 of furcation tube 10 according to conventional methods, and anchored thereto via the furcation tube strength members. For example, furcation tube 10 can be threaded through connector boot 58 and secured to connector 54 via a crimp ring (not shown) that crimps the furcation tube (and the strength members) to the connector.

Figure 14:
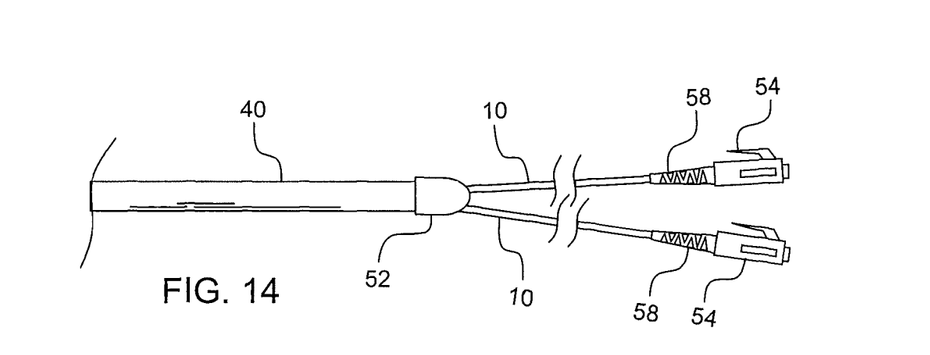
FIG. 14 is a side view of a connectorized optical fiber cable assembly having more than one furcation tube coupled to the optical fiber cable according to an embodiment of the present invention.

FIG. 14 depicts a fiber optic cable assembly comprising a plurality of furcation tubes 10.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A furcation tube for providing fanout of a plurality of optical fibers from an optical fiber cable, the furcation tube having a first end and a second end, and comprising:
   a partition member;
   a protective jacket disposed about the partition member, the furcation tube having an outside diameter in the range between about 2.8 mm and 5.6 mm; and
   wherein the partition member defines a plurality of fiber channels extending from the first end to the second end of the furcation tube, each of the fiber channels sized to loosely receive at least twelve optical fibers having an individual outside diameter of at least 235 µm each such that the optical fibers contained within each channel of the furcation tube are free to move within the channel, and wherein the partition member further defines a plurality of longitudinal strength member channels extending from the first end to the second end, each strength member channel including one or more strength members disposed loosely therein.

2. The furcation tube according to claim 1, wherein a cross sectional area of each fiber channel is at least 1 mm$^2$.

3. The furcation tube according to claim 1, wherein the one or more strength members comprise a polymeric yarn.

4. The furcation tube according to claim 1, wherein the partition member comprises web portions.

5. The furcation tube according to claim 1, wherein a cross sectional shape of the furcation tube is substantially circular.

6. The furcation tube according to claim 1, wherein the partition member comprises substantially planar web portions that bound the strength member channels, and an angle between the substantially planar web portions bounding the strength member channels is in a range between about 60 degrees and about 90 degrees.

7. The furcation tube according to claim 1, wherein an outside diameter of the furcation tube is in a range between about 2.8 mm and 3.3 mm.

8. A furcation tube for providing fanout of a plurality of optical fibers from an optical fiber cable, the furcation tube having a first end and a second end, and comprising:
   a plurality of longitudinal strength members, wherein the one or more strength members comprise a polymeric yarn; and
   a partition member,
      wherein the partition member defines a plurality of fiber channels extending from the first end to the second end of the furcation tube, each of the fiber channels sized to loosely receive at least twelve optical fibers having an individual outside diameter of at least 235

µm each such that the optical fibers contained within each channel of the furcation tube are free to move within the channel, wherein the partition member further defines a plurality of longitudinal strength member channels extending from the first end to the second end, each strength member channel including one or more of the plurality of strength members disposed loosely therein, and wherein the strength member channels do not include optical fibers; and the furcation tube having an outside diameter in the range between about 2.8 mm and 5.6 mm.

9. The furcation tube according to claim 8, wherein a cross sectional area of each fiber channel is at least 1 mm².

10. The furcation tube according to claim 8, wherein the one or more strength members comprise a polymeric yarn having a denier in the range from about 250 to about 3000 and comprising hundreds of individual filaments.

11. The furcation tube according to claim 8, wherein the partition member comprises web portions.

12. The furcation tube according to claim 8, wherein a cross sectional shape of the furcation tube is substantially circular.

13. The furcation tube according to claim 8, wherein the partition member comprises substantially planar web portions that bound the strength member channels, and an angle between the substantially planar web portions bounding the strength member channels is in a range between about 60 degrees and about 90 degrees.

14. The furcation tube according to claim 8, wherein an outside diameter of the furcation tube is in a range between about 2.8 mm and 3.3 mm.

15. A furcation tube for providing fanout of a plurality of optical fibers from an optical fiber cable, the furcation tube having a first end and a second end, and comprising:

a plurality of longitudinal strength members, wherein the one or more strength members comprise a polymeric yarn, wherein the one or more strength members comprise a polymeric yarn having a denier in the range from about 250 to about 3000 and comprising hundreds of individual filaments;

a partition member;

a protective jacket disposed about the partition member, the furcation tube having an outside diameter in the range between about 2.8 mm and 5.6 mm; and wherein the partition member defines a plurality of fiber channels extending from the first end to the second end of the furcation tube, each of the fiber channels sized to loosely receive at least twelve optical fibers having an individual outside diameter of at least 235 µm each such that the optical fibers contained within each channel of the furcation tube are free to move within the channel, and wherein the partition member further defines a longitudinal strength member channel extending from the first end to the second end, the strength member channel including one or more of the plurality of longitudinal strength members disposed loosely therein.

16. The furcation tube according to claim 15, wherein a cross sectional area of each fiber channel is at least 1 mm².

17. The furcation tube according to claim 15, wherein the partition member comprises web portions.

18. The furcation tube according to claim 15, wherein a cross sectional shape of the furcation tube is substantially circular.

19. The furcation tube according to claim 15, wherein the partition member comprises substantially planar web portions that bound the strength member channels, and an angle between the substantially planar web portions bounding the strength member channels is in a range between about 60 degrees and about 90 degrees.

20. The furcation tube according to claim 15, wherein an outside diameter of the furcation tube is in a range between about 2.8 mm and 3.3 mm.

* * * * *